Figure 1:
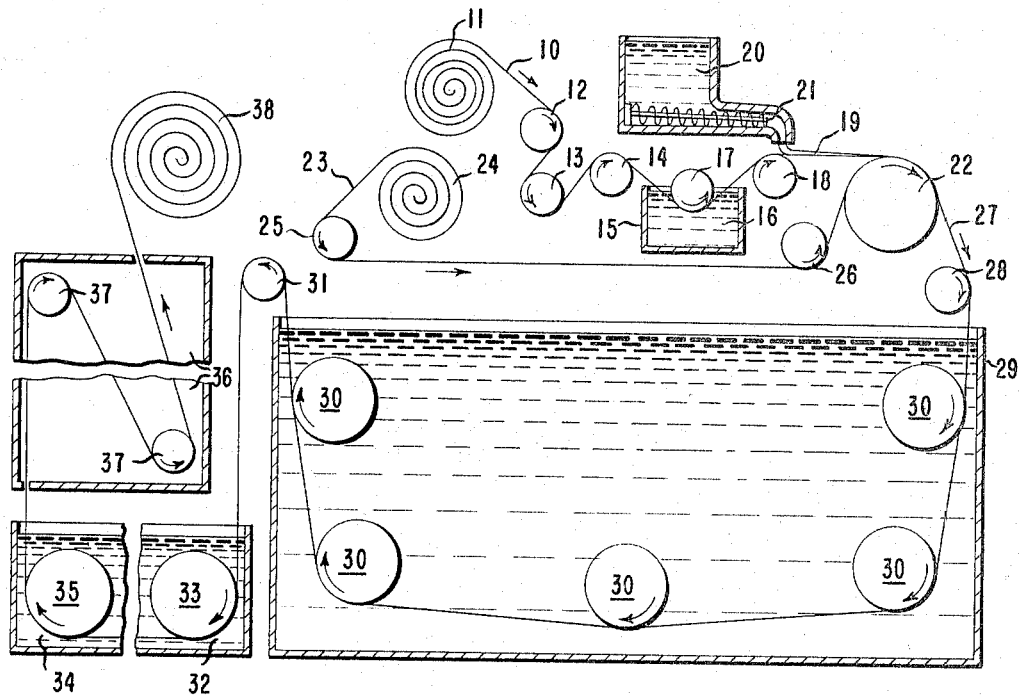

Nov. 8, 1966  D. G. HULSLANDER ETAL  3,284,274

CELLULAR POLYMERIC SHEET MATERIAL AND METHOD OF MAKING SAME

Filed Aug. 13, 1962

United States Patent Office 3,284,274
Patented Nov. 8, 1966

3,284,274
CELLULAR POLYMERIC SHEET MATERIAL AND
METHOD OF MAKING SAME
Donald G. Hulslander, Newburgh, and William F. Manwaring, Cornwall, N.Y., assignors to E. I. du Pont de Nemours and Company, Wilmington, Del., a corporation of Delaware
Filed Aug. 13, 1962, Ser. No. 216,576
10 Claims. (Cl. 161—159)

This invention relates to new and improved polymeric sheet materials of the type which comprise a cellular polymeric layer, and to a method of making the same. A preferred embodiment of the invention concerns such a product in the form of a man-made suede material. Another preferred embodiment concerns the manufacture of a novel leather-like vapor permeable sheet material comprising a microporous surface layer of durable elastomeric material, a fabric or other porous fibrous sheet material, and in interposed adherence with these two layers, a permeable layer of elastomeric material having a unique cellular structure.

There are well-known commercial uses for man-made suedes of the class comprising a fabric coated with a porous and/or abraded polymeric layer. But prior man-made suedes of this type have left much to be desired in appearance, durability, and/or vapor permeability (breathability). Consequently, many attempts have been made to produce a man-made polymeric suede having a deeper, duller, more velvet-like appearance, better vapor permeability, and improved retention of appearance when subjected to such wearing conditions as repeated rubbing, scuffing and flexing. A common drawback of prior man-made suedes and natural suedes is their tendency to develop an undesirable gloss quite readily when rubbed.

It is also well known that there are important uses for vapor permeable sheet materials comprising a "microporous" polymeric surface layer, that is, a layer in which substantially all the pores are too small to be seen by the unaided eye. Such sheet materials can be made in the form of an unsupported film or in the form of an adherent coating on a porous (usually fibrous) reinforcing substrate. For example, it is known that shoe-uppers, upholstery and clothing can be made from flexible vapor permeable sheet materials having an exposed wear-resistant layer of microporous elastomeric polymer integrally united to a woven or nonwoven fabric. Sheet materials of this type have been made which are very much like finished leather in durability, eye appeal and comfort characteristics.

But such leather-like sheet materials have lacked the desired surface smoothness for certain applications, for example in smooth-finish shoe-uppers. In some cases the lack of surface smoothness has been apparent in the materials prior to shoe fabrication; in other cases, only after shoe fabrication, especially in areas assembled under tension, such as the toe area. When using a woven fabric substrate, the weave pattern of the fabric has shown through the microporous coating unless the coating thickness was increased to a point where other problems were introduced, such as excessive cost and non-leather-like flex and fold properties.

Attempts have been made to make smoother products by using as the substrate some of the best known qualities of nonwoven fabrics, such as those made by (a) forming a thick web of carded retractable synthetic organic staple fibers, (b) needling the web to position many of the fibers perpendicular to the plane of the web, (c) causing the web to shrink by retraction of the retractable fibers, (d) impregnating the web throughout its thickness with an elastomer dispersed in a liquid, and (e) drying the impregnated web under conditions which result in a smooth vapor permeable nonwoven fabric. By exercising precise control of each step, nonwoven fabrics have been made by this method which have a very smooth and uniform appearance. After applying the microporous coating in the desired thickness range, the products have often had excellent surface smoothness while in a relaxed state. But when stretched, or when assembled under tension, the products have usually had such a lumpy appearance as to be unsuitable for use in good to high quality smooth-finish shoes.

Such leather-like sheet material has also often lacked the desired leather-like fold characteristics, even with the coating thickness within the normal range. When bent or folded upon itself with the microporous coating inside the fold, the fold pattern has resembled that of paper or cardboard (single crease or a few widely spaced creases) more than that of leather. The fold pattern of good quality shoe-upper leather, when folded upon itself with the skin or finished side inside the fold, is characterized by many fine, closely spaced wrinkles in the area of the fold. Such a fold pattern is referred to in the art as "leather-like grain break."

An object of this invention is to provide a novel cellular polymeric sheet material.

It is also an object to provide a new and improved man-made suede, and a method of making it.

Another object is the provision of a man-made leather-like vapor permeable sheet material which has good smoothness whether it is in a relaxed or stretched condition.

A further object is to provide a method of making a leather-like product having such smoothness characteristics.

Still another object is the provision of a leather-like sheet material having improved leather-like grain break.

Other important objects will be apparent from the description of the invention which follows.

The product of this invention in its broadest form is a sheet material comprising a layer of polymeric material in the form of a honeycomb-like cellular structure, at least 50% of the volume of said layer being composed of contiguous elongated cells having:

(a) An average diameter of about from 20–200 microns, (b) A substantially perpendicular orientation of their longest dimension in relation to the plane of the surface of the sheet, and (c) Thin microporous cell walls which, by virtue of their microporosity, render the cells intercommunicating.

In some preferred products of this invention, the honeycomb-like cellular layer is "macroporous," with at least 50% of the volume of the layer composed of cells visible to the unaided eye when a vertical cross section of the layer is examined closely under bright light.

The product of this invention as broadly defined above can be made by a novel method which comprises the following steps:

(a) Applying to a substrate a layer of a solution of polymeric material, (b) Coagulating said layer into a honeycomb-like cellular structure as defined above by bathing it in a liquid which is a nonsolvent for the polymeric material and is at least partially miscible with the solvent of said solution.

(c) Removing substantially all of the solvent from the layer, and (d) Removing substantially all the non-solvent from the resulting substantially solvent-free honeycomb-like cellular polymeric layer.

In preferred embodiments of the above described method, step (a) comprises at least one of the following additional limitations: (1) the solution layer contains about 10–30% polymer solids based on the weight of the layer; (2) the solution layer has a viscosity of about 10–500 poises at 24° C.; (3) the solution layer is thick enough so that after completion of steps (b), (c) and (d), the resulting honeycomb-like layer has a thickness of over 10 mils.

In the attached drawings:

FIGURE 1 illustrates the method used in Example 1 for producing a honeycomb-like cellular layer in superposed adherence with a two-layer composite fabric substrate.

Figure 2:
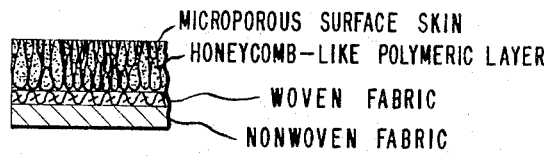

FIGURE 2 is an enlarged vertical cross-sectional view, somewhat diagrammatic and fragmentary in character, of the product of Example 1. This product has a layer of elastomeric material in the form of a honeycomb-like cellular structure in superposed adherence with a 2-layer (woven/nonwoven) composite fabric. There is a thin adherent microporous skin of the elastomeric material on the top surface of the product; this skin is an integral part of the as-formed (non-abraded) honeycomb-like layer. The composite fabric is impregnated and bonded together with porous elastomeric material.

Figure 3:
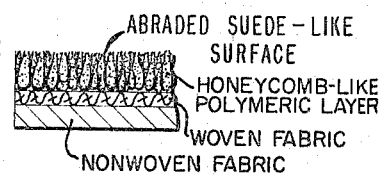

FIGURES 3, 4, 5 and 6 are corresponding views of the products of Examples 2, 3, 7 and 5 respectively. The product shown in FIGURE 3 is a man-made suede produced by buffing or abrading the top surface of the product shown in FIGURE 2 with abrasive-coated paper to remove the surface skin and open up the cells at the surface.

Figure 4:
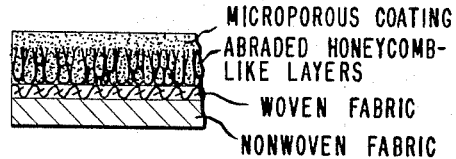

The product shown in FIGURE 4 is a leather-like sheet made by applying a durable very fine-pore microporous coating of elastomeric material on the suede-like surface of a sheet material similar to the one shown in FIGURE 3.

Figure 5:
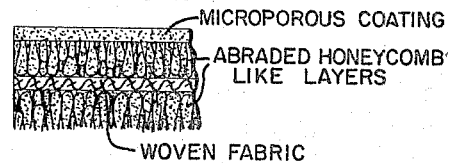

The product shown in FIGURE 5 has a woven fabric in interposed adherence with 2 honeycomb-like layers, both of which have been abraded, and the top layer coated with a durable very fine pore microporous polymeric coating. The bottom surface of the product is suede-like and the top surface leather-like.

Figure 6:
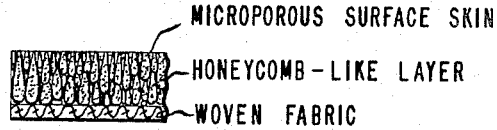

The product shown in FIGURE 6 is composed of a woven fabric coated on one side with a non-abraded honeycomb-like polymeric layer.

The honeycomb-like cellular layer can be made of any polymeric film-forming material of which a liquid solvent solution can be formed and a layer of the solution dried to form a normally solid polymeric film (i.e., solid at normal atmospheric temperatures). The polymeric material can consist of straight polymer, or blends thereof with such additives as curatives, coloring agents, plasticizers, stabilizers and fillers. The skilled artisan will have little difficulty in selecting a polymeric material having properties suited to the intended application, such as flexibility, cold flow resistance, hardness and toughness. A large number of polymers, either individually or in combination, can be used, including for example polyurethane polymers, vinyl halide polymers, polyamides, polyesteramides, polyesters, polyvinyl butyral, polyalphamethylstyrene, polyvinylidene chloride, alkyl esters of acrylic and methacrylic acids, chlorosulfonated polyethylene, copolymers of butadiene and acrylonitrile, cellulose esters and ethers, polystyrene and other polymers made from monomers containing vinyl groups. For preferred flexible suede-like and leather-like products, a flexible (non-rigid) polymeric material should be used. A polymeric material having an initial modulus below 1.0 gram per denier is usually preferred, especially one that is elastomeric. High polymer flexibility and high void volume in the honeycomb-like layer both are factors tending to increase product flexibility.

In practicing the process of this invention, the first step is to prepare a solution of the polymeric material in a suitable solvent.

An extremely useful polymeric component of the solution when making man-made suedes and leather-like sheet materials is a polyurethane elastomer. Particularly preferred is a polyurethane elastomer made by reacting an organic diisocyanate with an active hydrogen containing polymeric material such as a polyalkyleneether glycol or a hydroxyl-terminated polyester to produce an isocyanate-terminated polyurethane prepolymer, and reacting the resulting prepolymer with a chain-extending compound such as water or a compound having two active hydrogen atoms bonded to amino-nitrogen atoms. Useful polyurethane elastomers can also be made by replacing all or part of the polymeric glycol with a simple nonpolymeric glycol (e.g., ethylene glycol or propylene glycol). Hydrazine and N-methyl-bis-aminopropylamine are preferred amino nitrogen containing chain extenders; however, others which are useful include dimethyl-piperazine, 4-methyl-m-phenylene-diamine, m-phenylene-diamine, 1,4-diaminopiperazine, ethylene diamine and mixtures thereof.

The polyurethane elastomer can be prepared by first mxing a molar excess of the diisocyanate with the active hydrogen containing polymeric material and heating the mixture at about 50–120° C. until the prepolymer is formed. Or, the diisocyanate can be reacted with a molar excess of the active hydrogen containing polymeric material, and the reaction product capped by reacting it with more diisocyanate to form the prepolymer.

Aromatic, aliphatic and cycloaliphatic diisocyanates or mixtures thereof can be used in forming the prepolymer. Such diisocyanates are, for example, tolylene-2,4-diisocyanate, tolylene-2,6-diisocyanate, m-phenylene diisocyanate, biphenylene 4,4'-diisocyanate, methylene bis(4-phenyl isocyanate), 4-chloro-1,3-phenylene diisocyanate, naphthalene-1,5-diisocyanate, tetramethylene-1,4-diisocyanate, hexamethylene-1,6-diisocyanate, decamethylene-1,10-diisocyanate, cyclohexylene-1,4-diisocyanate, methylene bis(4-cyclohexyl isocyanate) and tetrahydronaphthalene diisocyanate. Arylene diisocyanates, that is, isocyanates in which the isocyanate groups are attached to an aromatic ring are preferred. In general they react more readily than do alkylene diisocyanates.

A polyalkyleneether glycol is the preferred active hydrogen containing polymeric material for the prepolymer formation. The most useful polyglycols have a molecular weight of 300 to 5000, preferably 400 to 2000, and include, for example, polyethyleneether glycol polypropyleneether glycol, polytetramethyleneether glycol, polyhexamethyleneether glycol, polyoctamethyleneether glycol, polynonamethyleneether glycol, polydecamethyleneether glycol, polydodecamethyleneether glycol and mixtures thereof. Polyglycols containing several different radicals in the molecular chain such as, for example, the compound $HO(CH_2OC_2H_4O)_nH$ wherein $n$ is an integer greater than 1 can also be used.

Polyesters which can be used instead of or in conjunction with the polyalkyleneether glycols are, for example, those formed by reacting acids, esters or acid halides with glycols. Suitable glycols are polymethylene glycols, such as ethylene-, propylene-, tetramethylene-, decamethylene glycol, substituted polymethylene glycols such as 2,2-dimethyl-1,3-propanediol, cyclic glycols such as cyclohexanediol and aromatic glycols such as xylylene glycol. Aliphatic glycols are generally preferred when maximum product flexibility is desired. These glycols are reacted with aliphatic, cycloaliphatic or aromatic dicarboxylic acids or lower alkyl esters or ester forming derivatives thereof to produce relatively low molecular weight polymers, preferably having a melting point of less than about 70° C., and molecular weights like those indicated for the polyalkyleneether glycols. Acids for preparing such polyesters are, for example, succinic, adipic, suberic, sebacic, terephthalic and hexahydroterephthalic acids and the alkyl and halogen substituted derivatives of these acids.

The chain extension reaction is usually carried out at a temperature below 120° C. and often at about room temperature, particularly for hydrazine-extended polymers. During the reaction, prepolymer molecules are joined together into a substantially linear polyurethane polymer, the molecular weight of which is usually at least 5000 and sometimes as high as 300,000. The reaction can be carried out without a solvent in heavy duty mixing equipment or it can be carried out in a homogeneous solution. In the latter case it is convenient to use as a solvent one of the organic solvents to be employed in the polymer solution.

Since the resulting polyurethane polymer has rubber-like elasticity, it is referred to as an "elastomer," although the degree of elasticity and rubber-like resilience may vary widely from product to product depending on the chemical structure of the polymer and the materials in combination with it.

A vinyl chloride polymer is another preferred component of the solution used in forming the honeycomb-like cellular layer when making man-made suedes and leather-like sheet materials. Superior product abrasion resistance is obtainable when a vinyl chloride polymer is used in combination with an elastomer such as the polyurethane described above. When making a flexible shoe upper material or the like from a blend of polyurethane elastomer and vinyl chloride polymer, it is often preferred to employ a major proportion (over 50 weight percent) of the former and a minor proportion (less than 50 weight percent) of the latter. However, good leather-like and suede-like products are also obtainable in accordance with this invention when the polymeric component of the honeycomb-like layer contains a major proportion (at least 51% by weight) of vinyl chloride polymer, especially when used in combination with a plasticizer for the polymer or in combination with a minor proportion of polyurethane elastomer. For example, a very useful man-made leather can be made by using a polymeric material containing a major proportion of polyvinyl chloride and a minor proportion of polyurethane elastomer for the honeycomb-like layer, abrasion buffing this layer, and coating it with a durable finely microporous layer of polymeric material containing a major proportion of polyurethane elastomer and a minor proportion of polyvinyl chloride.

Useful vinyl chloride polymers include polyvinyl chloride and copolymers of a major proportion, preferably at least 80%, of vinyl chloride and a minor proportion of another ethylenically unsaturated monomer, such as vinyl acetate, vinylidene chloride, or diethyl maleate.

If the product of this invention is being made under conditions adverse to the formation of the previously defined honeycomb-like cellular layer—for example, if the polymeric component is a very flexible elastomer, the coating is relatively thin (e.g., less than 10 mils when dry), and the coating solution has a relatively low polymer content (e.g., below 8% solids)—the desired honeycomb-like structure can be obtained by replacing part of the elastomer with a relatively hard polymer, such as polyvinyl chloride.

The polymer component selected is dissolved in enough solvent to yield a solution having the desired solids content and viscosity. An organic solvent is usually preferred but suitable inorganic solvents can also be used. For doctor-knife application, it is usually preferred to use a solution which has a polymeric content of about 10–30 weight percent and a viscosity of about 10–500 poises. Also, the use of such a solution facilitates the attainment of the honeycomb-like cellular layer of this invention. The solvent used in the solution should be one that is miscible, preferably completely miscible, with the non-solvent liquid to be used in practicing the invention. N,N-dimethyl formamide is a highly useful solvent for the polymers soluble therein in view of its high solvent power for many of the preferred polymers as well as its high miscibility with the generally preferred nonsolvent liquids including water. Other useful solvents include dimethyl sulfoxide, tetrahydrofuran, tetramethyl urea, N,N-dimethyl acetamide, N-methyl-2-pyrrolidone, ethyl acetate, dioxane, butyl carbinol, toluene, phenol, chloroform, and gamma-butyrolactone. Also useful are blends of these solvents with various water-miscible liquids, such as ketones and alcohols which alone are often poor solvents for the polymer. One very useful blend is composed of dimethyl formamide and methyl ethyl ketone.

When the solvent is to be removed from the applied layer merely by drying, it should be more volatile than the nonsolvent used in the process so that some nonsolvent will still be present in the layer after the solvent has been removed.

An optional step in practicing this invention is to admix a limited amount of a nonsolvent for the polymer with the polymer solution prior to its application to the substrate. The addition of nonsolvent to the coating solution is a means of controlling the diameter of the cells obtained in the honeycomb-like layer. For example, cell diameter tends to increase as the amount of nonsolvent is increased when the polymer is a blend of polyurethane elastomer and vinyl chloride polymer and when the amount of nonsolvent added is about from 1–80% of the amount that would transform the solution to an incipient gel. The nonsolvent should be a liquid that is at least partially miscible with the solvent in the solution. The nonsolvent can be added in an amount up to but not including the amount which starts to transform the solution into an incipient gel or substantially colloidal dispersion of polymer particles. If the polymer solution was clear initially, it will normally still be substantially clear after the nonsolvent has been added; if it has gone from clear to hazy, this indicates that too much nonsolvent has been added. The addition of too much nonsolvent leads to a microporous layer in which most of the pores are well below 20 microns in diameter and a cell structure quite unlike the above described honeycomb-like layer. The useful nonsolvents include water, ethylene glycol, glycerol, glycol monoethyl ether, hydroxyethyl acetate, tertiary butyl alcohol, 1,1,1-trimethylol propane, methanol, ethanol, hexane, benzene, naphtha, toluene, tetrachloroethylene, chloroform and the like. When operable, water and blends thereof with water-miscible liquids are usually preferred.

Before the water or other nonsolvent is added to the polymer solution, it is preferably blended with a substantial proportion, for example from about 2 to 5 times its own weight, of a solvent of the type used in preparing the polymer solution. Addition of the nonsolvent to the solution should be done gradually and with stirring to prevent localized coagulation.

An experienced operator will have little difficulty in estimating the best amount of nonsolvent to be added to a solution of a particular type of polymer for the production of a particular type of product. An inexperienced operator can readily predetermine a desirable nonsolvent range by making a small trial run. For example, he can add to 5 small samples of the main body of solution 0%, 30%, 60%, 80% and 90% respectively of nonsolvent, based on the previously determined amount needed to cause initial transformation of the coating composition from a solution to a colloidal dispersion, complete the process in accordance with the teaching herein and according to his best judgment, select the sample product best fitted to the intended use, and calculate the proportionate amount of nonsolvent he wishes to add to the main body of solution.

After the nonsolvent, if any, has been added to the polymer solution, a layer of the solution is applied to a substrate. Coating methods which are useful for applying the layer are exemplified by doctor-knifing, extruding, dipping, spraying, brushing and roller-coating.

When making such preferred products as man-made suedes and smooth-surface leather-like sheet materials for shoe uppers, upholstery and the like, a layer of the polymer solution is applied to one or both sides of a flexible porous fibrous substrate, for example a nonwoven fabric, a waterleaf, a woven or knitted fabric, or any one of the many grades of natural leather, Or the substrate can be a sheet of nonfibrous porous polymeric material, such as a tough microporous or perforated film. Adhesion of the cellular layer is usually best when some of the solution layer is allowed to soak into or impregnate the porous substrate before the coagulation step. The solution layer can also be interposed between two or more of such sheet materials to become a honeycomb-like cellular bonding layer. The fibers of the substrate can be natural or synthetic, crimped or straight, organic or inorganic, continuous filament or staple, or of papermaking length. When bathed and dried in accordance with the method of this invention, the layer of solution becomes a honeycomb-like cellular polymeric layer integrally united to the substrate.

An unsupported honeycomb-like cellular polymeric film or sheet is obtained by applying the layer of polymer solution to a removable substrate, which may be a smooth impervious material such as polished glass, stainless steel, aluminum foil or plastic film, or the substrate may be a fibrous substrate coated with a release coating. Then the process is carried to completion by the steps of coagulation bathing and removal of solvent, nonsolvent and substrate in turn.

The substrate-supported layer of polymer solution is bathed in a nonsolvent for the polymer under conditions which cause the layer to become coagulated into a honeycomb-like cellular structure having the characteristics set forth above under the broad description of the product of this invention and set forth below in greater detail. The nonsolvent used for the coagulation bathing step should be a liquid that is at least partially miscible with the solvent of the polymer solution. The useful nonsolvents include those listed above in connection with addition of nonsolvent to the solution prior to the coating step.

The solution layer is placed in contact with the nonsolvent bathing liquid, for example by sudden immersion therein, by first floating the layer on top of a body of the bathing liquid followed by immersion therein, or by subjecting the layer to a spray of the bathing liquid followed by immersion therein. "Bathing" is intended to mean causing the nonsolvent, in liquid form—for example, as a unitary body or as a spray—to come in contact with the solution layer. When smoothness is important, it is usually best not to use a spray in the early stages of bathing.

Care should be taken not to subject the solution layer to highly humid atmosphere or other nonsolvents in vapor form for a long enough time to permit any substantial amount of coagulation of the layer prior to bathing the layer with nonsolvent in liquid form. This is to avoid the danger of obtaining a porous layer in which most of the pores are well below 20 microns in diameter. Such a layer would not be capable of accomplishing the objects set forth above when substituted for the honeycomb-like layer of this invention.

With any particular polymer solution the skilled artisan will encounter little difficulty in view of the present disclosure in selecting the bathing time and temperature conditions that will cause the layer of solution to coagulate into the desired honeycomb-like cellular structure. It is often preferred to have the coagulation bath at a temperature somewhat above normal room temperature (e.g., at about 50° C.), at least during the early part of the coagulation step. The use of a warm bath is particularly desirable when coating only one side of a liquid pervious substrate and when a product of good vapor permeability is desired. However, when a solution layer is coagulated on both surfaces of a porous substrate simultaneously, or when a solution layer is coagulated on a substrate that is not liquid pervious (and later removed from the film), good product vapor permeability can often be obtained with a cold coagulation bath.

Regulation of the coagulant temperature is a means not only of controlling product permeability but also of controlling the diameter of cells obtained in the honeycomb-like layer. One skilled in the art will have little difficulty in determining whether cell diameter increases or decreases, as coagulant temperature is varied, with a particular polymer and under particular coagulation conditions.

The next step is to remove substantially all the polymer solvent from the resulting coagulated cellular layer before at least the last appreciable portion of nonsolvent is removed therefrom. When the solvent is more volatile than the nonsolvent, this can be done by subjecting the layer to drying conditions, for example, in an oven or similar heat zone. A preferred solvent removal method is to bathe the cellular layer with water or another "nonsolvent" (as previously defined) until the layer is substantially free of the polymer solvent.

The resulting substantially solvent-free honeycomb-like cellular layer is then freed of substantially all the nonsolvent remaining therein, for example by drying it in a heat zone in which there is forced air circulation.

The product of this invention in every case contains a layer of polymeric material which has a cellular structure that is "honeycomb-like"; in other words, the layer has a cell pattern resembling or suggesting that of a honeycomb. This does not mean that the cells are necessarily hexagonal in transverse cross-section; in fact they are usually circular or oval. Nor does it mean that the cells are similar in size to those of a real honeycomb; actually, 50–100% of the volume of the layer is composed of cells which have an average diameter of about from 20–200 microns.

The cellular structure is honeycomb-like in the fact that at least 50% of the volume of the cellular layer is composed of cells that are contiguous, or in contact with one another;
elongated, or greater in height than in average diameter;
perpendicularly oriented—that is, they have a substantially perpendicular orientation of their longest dimension in relation to the plane of the surface of the sheet;
shaped generally like a hollow cylinder—thus they are tubular or fistulous; and
defined by cell walls that are quite thin in relation to the average cell diameter, the wall thickness usually being but a fraction (e.g., ¼ to ½₀ or less) of the cell diameter.

Unlike real honeycombs and unlike prior art polymeric cellular structures containing tubular cells (including the so-called "closed-cell" structures), the cell walls in the honeycomb-like layer of this invention are predominantly microporous and vapor permeable.

The as-formed honeycomb-like layer in at least the preferred products of this invention can be regarded as having a closed-cell structure when viewed in vertical cross-section since the cell-wall pores are much too small to be seen under the minimum conditions needed clearly to reveal the elongated cells in the major volume of the layer.

In the honeycomb-like layer of preferred embodiments of this invention, at least 50% of the volume of the layer is composed of cells having a tapered shape, with the cell diameter becoming progressively larger from the exposed surface of the layer towards the surface adjacent the substrate.

The term "diameter" in reference to the elongated cells is used for the sake of convenience, even though all the cells are not perfectly circular in transverse cross-section. When applied to a non-circular cell, the diameter designates a value equal to what the diameter would be if the cell were circular and of the same area; this may be calculated from the area of the transverse cross-section. At least some of the cells may extend from top to bottom of the layer. However, the layer in the as-formed condition (before any cutting away of the exposed surface) usually contains many cells positioned one atop the other, with those nearest the exposed surface being of smallest diameter. At the exposed surface the as-formed layer is usually finely microporous.

Having the cells tapered so that the smallest cell diameter is at the exposed surface of the layer enhances the cellular layer's wear resistance, ability to keep out wind, water and dirt, and utility in making leather-like sheet material having improved leather-like grain break, and improved surface smoothness both when relaxed and when stretched. Such tapered cells also enhance the utility of the layer in making more durable and attractive man-made suedes.

At least 50% of the volume of the honeycomb-like layer is composed of cells which have an average diameter of about from 20–200 microns, and more preferably about 50–100 microns. The 50–100 micron range usually results in suedes having the best color and properties related to the sense of touch; this range also usually results in smooth-finish man-made leathers having the best combination of durability, smoothness and grain break after applying a very fine pore microporous polymeric topcoat. The average diameter of an individual tapered cell is obtained by measuring the diameter at several evenly-spaced points from top to bottom of the cell, and dividing the sum of the measurements by the number of measurements. The remainder (0–50%) of the volume of the layer can be composed of cells which have an average diameter of substantially less than 20 microns or of more than 200 microns. But it is generally preferred that the average diameter of substantially all the cells in at least the upper one-fourth (the portion furthest from the substrate) of the as-formed layer be less than 100 microns in the interest of achieving optimum results in accordance with the objects of this invention.

The majority of the cell voids of the honeycomb-like layer are separated from one another by a relatively thin wall of microporous polymeric material. The pores in the cell walls preferably have a diameter of about from 1–10 microns. The cell walls make up a minor proportion of the total volume of the layer; the voids defined by the cell walls, a major proportion.

For most products the honeycomb-like layer should have a thickness greater than 100 microns, preferably at least several hundred microns.

When the honeycomb-like cellular layer is integrally united to a suitable substrate and at least the thin surface skin of the as-formed layer is abraded or cut away, for example with abrasive paper, there is produced a new and improved man-made suede. The cellular layer does not have to be dried before it is abraded. Removal of at least the surface skin of the as-formed layer by an abrading, tearing or cutting action to leave the cells open at the exposed surface is the only step needed to convert the sheet material into a surprisingly durable and attractive suede-like product. In preferred suede-like products of this invention enough of the surface is cut away so that the majority of cells at the exposed surface have a diameter of at least 10 microns, and more preferably at least 50 microns. The appearance and durability of the product are at their best when a majority of the cells in the honeycomb-like layer have a tapered shape as described above, so that the cells have their smallest diameter at the exposed surface of the suede-like layer. The substrate for the suede-like layer in the most useful products should be a flexible sheet material, preferably a fibrous vapor permeable sheet material.

When the honeycomb-like cellular layer is integrally united to a suitable substrate (preferably porous and fibrous) and the top (honeycomb-like) side of the resulting laminate is coated with an adherent microporous layer of polymeric material in which most of the pores are below 20 microns in diameter, preferably below 10 microns in diameter, there is produced a leather-like sheet material which is surprisingly smooth both when relaxed and when stretched. The microporous coating layer can be applied to a honeycomb-like layer which is either in the as-formed (non-abraded, skin covered) or suede-like (abraded, open-cell) state. However, in the interest of obtaining optimum smoothness and vapor permeability, it is usually best to use a honeycomb-like layer that has been at least lightly abraded. When the product is intended for such uses as shoe-uppers, garments and upholstery, the polymeric material in both the honeycomb-like and microporous coating layers should be flexible. An elastomeric material is usually best for such applications, but in some cases a polymeric material having an initial modulus of up to 1.2 grams per denier or higher can be used.

The more useful methods for applying the microporous coating on the honeycomb-like layer include the methods taught in the following patent and pending applications, the teachings of which are incorporated herein by reference:

(a) U.S. Patent 3,000,757, issued on September 19, 1961.

(b) Copending U.S. application S.N. 90,815, filed on February 21, 1961, now U.S. Patent 3,100,721.

(c) Copending U.S. application S.N. 148,851, filed on October 31, 1961, now U.S. Patent 3,190,766.

(d) Copending U.S. application S.N. 164,589, filed on January 5, 1962, now U.S. Patent 3,208,875.

These four methods have certain similarities and certain significant differences when compared with each other. Each of them results in a microporous layer in which the micropores communicate with each other and with the surfaces. Thus, the resulting coating layer has a substantial permeability value, usually about from 1000 to 10,000 or more. "Permeability value" designates the degree of breathability as measured by the test described by Kanagy and Vickers in the "Journal of the Leather Chemists Association," vol. 45, pp. 211–242, dated April 19, 1950.

Method (a) involves applying to a substrate a layer of a solution of polymer in a liquid solvent, coagulating the layer into a microporous structure by bathing it with a nonsolvent in vapor form, removing the solvent, and then removing the nonsolvent.

Method (b) involves applying a layer of a dispersion of polymer in a liquid solvent which dispersion has been made by adding enough nonsolvent to a polymer solution to convert it to a substantially colloidal dispersion or incipient gel, coagulating the layer into a microporous structure by bathing it with a nonsolvent, removing the solvent, and then removing the nonsolvent.

Method (c) involves applying a layer of polymeric gel which has been made by adding enough nonsolvent to a polymer solution to render it separable into gel and liquid portions and separating the gel portion, coagulating the layer into a microporous structure by bathing it with a nonsolvent, removing the solvent, and then removing the nonsolvent.

Method (d) involves applying a layer of a solution of polymer in a liquid solvent, coagulating the layer into a microporous structure by bathing it with a 10:90 to 95:5 (weight ratio) solvent:nonsolvent blend, removing the solvent, and then removing the nonsolvent.

The four methods of applying the microporous coating just described when considered as a group may be described generically as follows: A method which comprises (a) applying to a substrate a layer of polymeric material dispersed in a liquid which is a solvent for the polymer, (b) coagulating said layer into an intercommunicating microporous structure by bathing it with a nonsolvent for the polymer that is at least partially miscible with said solvent, (c) removing substantially all of the solvent from the layer, and (d) removing substantially all of the nonsolvent from the resulting substantially solvent-free microporous polymeric layer.

When the microporous coating is integrally united during or after its formation to the top (honeycomb-like) side of the previously described laminate of the honeycomb-like layer and porous fibrous substrate, it is possible to make leather-like sheet materials having advantages over prior leather replacements as well as over natural leather for many applications. For example, shoe-upper material is obtainable which combines natural leather-like appearance, durability and comfort characteristics with freedom from the wide periodic fluctuation in cost and variation in properties known to characterize natural leather. Moreover, the availability of the product in continuous lengths and any desired width in substantially uniform and blemish-free quality gives it a distinct advantage over natural leather for such applications as jackets and other garments, upholstery, luggage, table and roll coverings, and ink rollers. Furthermore, surface roughness and irregularities of the preferred woven and nonwoven fabric substrates are much less inclined to be visible in the surface of the product, regardless of whether the product is in the relaxed or stretched condition, than was the case with prior art leather-replacements made by applying microporous coatings to such substrates. Also preferred products of this invention are characterized by superior leather-like grain break.

Some applications require a sheet material which has good smoothness and leather-like grain break, but which does not need to be vapor permeable, for example luggage, handbags, open construction shoe-uppers, bookcovers and upholstery items used in non-seating areas For such applications, improved products can be made in accordance with this invention by applying a porous or non-porous wear resistant polymeric coating over the honeycomb-like layer. The honeycomb-like layer and non-porous coating cooperate to provide a surprising combination of properties including wear resistance, leather-like grain break and improved smoothness in both the relaxed and stretched states. The wear resistant coating can be, for example, a microporous coating of the type described above or a nonporous coating applied by conventional solution coating, latex coating or other known polymer coating methods.

The method of this invention is adaptable to the rapid and economical production of new and improved vapor permeable man-made suedes and man-made smooth-surface leather-like sheet materials. Consistant yields of uniformly high quality products of this type are readily obtainable.

The examples which follow are given for the purpose of illustrating the invention. All quantities shown are on a weight basis unless otherwise indicated.

*Example 1*

A 20% solution of polyurethane elastomer is prepared by first mixing 3343 parts of polytetramethyeneether glycol of about 1000 molecular weight with 291 parts of tolylene-2,4-diisocyanate and heating the mixture for 3 hours at 90° C. Then 2485 parts of the resulting hydroxyl-end-group-containing dimer are mixed with 570 parts of methylene-bis-(4-phenyl-isocyanate). This mixture is heated for one hour at 80° C., yielding a prepolymer with isocyanate end groups. The prepolymer is dissolved in 10,000 parts of N.N-dimethyl formamide (sometimes referred to simply as dimethylformamide), and the resulting solution is added slowly to a solution consisting of 50 parts of chain extender dissolved in 1,710 parts of dimethyl formamide. The chain extender consists of N-methyl-bis-amino-propylamine and hydrazine hydrate in a molar ratio of 40:60. The resulting reaction mixture is stirred at 40° C. for 30 minutes to form a polyurethane solution having a viscosity of about 115 poises and a polymer content of about 20%.

A polymer solution consisting of 10.5% polyurethane elastomer, 5.7% polyvinyl chloride and 83.8% dimethyl formamide is prepared by admixing a 12% solution in dimethyl formamide of polyvinyl chloride with a suitable amount of the 20% polyurethane solution.

Referring now to FIGURE 1 of the attached drawings, a running length of woven fabric 10 is unwound from roll 11. The woven fabric is a cotton sheeting having a width of 42 inches, a weight of one pound per 4.95 linear yards, and a thread count of 64 x 60. Fabric 10 is passed around rolls 12, 13, and 14, and into tank 15 where the fabric is immersed in dimethyl formamide 16 and is passed beneath roll 17 in the tank. As the dimethyl formamide-wet fabric leaves tank 15 it passes over roll 18, where it is coated on the top side with a layer 19 of polymer solution by means of extrusion coating device 21. Tank 20 holds a supply of the polymer solution, which is the solution prepared above in this example. Part of layer 19 soaks into or impregnates the fabric during its travel from roll 18 to roll 22. The temperature in the room during the coating operation is 21° C. and the relative humidity is 20%, a desirable room atmosphere for coating. High humidity is avoided to insure against premature coagulation of the polymer solution which would prevent formation of the desired cellular structure.

A running length of nonwoven fabric 23 is unwound from roll 24 and passed around rolls 25, 26 and 22 simultaneous to the advance of fabric 10 whereby impregnated and coated fabric 10 is placed in superposed adherence with fabric 23 during the travel of these materials around roll 22, resulting in the formation of composite sheet 27. Enough of the polymer solution migrates from fabric 10 into and through the surface of fabric 23 to serve as an adhesive which ultimately bonds the two fabrics permanently to each other and to the cellular layer of polymer. The nonwoven fabric is a polyurethane elastomer impregnated fibrous sheet prepared in accordance with the teaching in Example 1 of U.S. patent application S.N. 835,431 filed August 24, 1959. It weighs 6.5 ounces per square yard and is made by needle-punching and shrinking a batt of 0.5 denier retractable poly(ethyleneterephthalate) fibers followed by impregnation with about 35%, based on the batt's fiber content, of a hydrazine-extended polyurethane elastomer similar to the one described above in this example, except the chain-extender used consists entirely of hydrazine.

Composite sheet 27 passes around roll 28, into tank 29 containing water at 50° C., around rolls 30, out of the tank, around roll 31 and into tank 32. It takes sheet 27 about 3.5 minutes to pass through the water in tank 29. This is sufficient to permit the layer of polymer solution (layer 19) on the sheet to coagulate to such an extent that the layer is not damaged as the sheet passes around roll 31 en route to tank 32.

Coagulation of layer 19 into the desired honeycomb-like cellular structure is completed in tank 32, a small section of which is shown in FIGURE 1. At the same time, the polymer solution that impregnated the substrate is coagulated into a porous polymeric structure. Here, sheet 27 passes around roll 33 and other rolls not shown while layer 19 is bathed with water at 80° C. for 3.5 minutes. Sheet 27 now passes into tank 34, a small section of which is shown in FIGURE 1, and around roll 35 and other rolls not shown while layer 19 is bathed with water at 95° C. for 40 minutes to remove substantially all of the dimethyl formamide that was not previously removed in tanks 29 and 32.

The solvent-free sheet is then passed into oven 36, around rolls 37, out of the oven, and is wound up on roll 38. While in the oven, the sheet is exposed to an ambient air temperature of 120° C. for 15 minutes to render the sheet substantially dry.

The dried honeycomb-like cellular polymeric layer resulting from the bathing and drying of layer 19 is very flexible and has a thickness of 13 mils (0.013 inch). The cells in this layer are predominantly circular or oval in transverse cross-section. Over 50% of the volume of the cellular layer is composed of cells that are: (1) contiguous, (2) elongated, (3) substantially perpendicularly oriented, (4) tubular or fistulous in shape, (5) tapered so that the cell diameter becomes progressively larger from the exposed surface of the layer towards the surface adjacent the substrate, (6) defined by microporous cell walls that are very thin in relation to the average cell diameter, and that render the cells intercommunicating and vapor permeable, and (7) about 80 microns in average diameter.

The exposed surface of the cellular layer is covered with a relatively thin microporous vapor permeable polymeric skin. The product has a permeability value of about 3500. The woven fabric and nonwoven fabric are integrally united to each other and to the honeycomb-like layer by a porous mass of the same elastomeric material as the honeycomb-like layer is composed of. The porous elastomeric mass extends from its integral relationship with the honeycomb-like layer through the woven fabric and through the adjacent surface of the nonwoven fabric.

The dried composite sheet material on roll 38 is durable, flexible, and vapor permeable enough to be useful as it is for such applications as garments, garment linings and upholstery. An enlarged vertical cross-section of the product is shown in FIGURE 2. The product can be produced in colors by incorporating coloring agents within the structure as it is made or by treating it in a dye bath afterwards. It is also very useful as an intermediate product for the manufacture of improved man-made suedes and smooth-surface leather-like sheet materials.

*Example 2*

Example 1 is repeated except 8 parts of carbon black are added to 100 parts of the polymer solution used in Example 1. The carbon black is ground with a portion of the solution of polyvinyl chloride to facilitate blending. Both of the fabrics (10 and 23) are dyed black. As the composite sheet product leaves the oven it is passed through a cooling chamber to cool it to room temperature. Then it is passed through a "sanding machine" in which a roll covered with No. 240 abrasive paper is used to abrade the cellular surface until 3 mils of the honeycomb-like layer are removed. The average cell diameter at the abraded surface is about 50 microns. Finally, the product is wound up on a roll for storage or shipment. It is now a high quality man-made suede. An enlarged vertical cross-section of the product is shown in FIGURE 3. Known finishing methods, such as those commonly used on natural suedes, can be used to alter the appearance and other surface characteristics of the product. For example, it can be dyed, or coated with compositions containing film formers, coloring agents, antistatic agents, and/or fireproofing compounds.

The product has an attractive deep, dull, velvet-like smooth and uniform appearance. It is not damaged by rain. It can be repeatedly scuffed with a coin, rubbed with cotton duck, folded and scrubbed against itself, and flexed many thousands of times without any substantial change in appearance. It is pleasing to the sense of touch. It is highly breathable, having a permeability value of 6340. Thus, it has excellent comfort characteristics for use in contact with the body.

The man-made suede produced in this example is useful for such applications as shoe uppers, upholstery, handbags, gloves, caps, hats, jackets and other garments, and wherever suedes made from animal skins are used.

*Example 3*

Ten parts of a 1:4 blend of water and dimethyl formamide are gradually added to 100 parts of the polyurethane/polyvinyl chloride polymer solution described in Example 1. This is 55.5% of the amount of water needed to start transformation of the solution into a colloidal polymeric dispersion.

A running length of the product of Example 2 is unwound from a storage roll and passed through an extrusion coating device where the water-modified polymer solution is applied to the abraded honeycomb-like layer to a wet-film thickness sufficient to give a coating of 7 mils when dried. The layer of polymer solution is coagulated into a very fine pore intercommunicating microporous structure by passing the coated material coating-side-down along the surface of a body of liquid consisting of a 90:10 blend of dimethyl formamide and water at 27° C. for 30 seconds, followed by completely immersing the coated material in the liquid for 2.5 minutes. The coated material is then immersed in a water bath at 16° C. for 10 hours to remove substantially all of the dimethyl formamide. Finally, the coated material is dried in a 100° C. heat zone. The microporous coating has excellent durability and it contains substantially no pores visible to the unaided eye.

The pores in the microporous coating are predominantly less than 20 microns in diameter and the majority of them are less than 10 microns in diameter. The pores communicate with one another and with the surfaces of the coating.

The 7 mil thick microporous coating is dyed black by immersing the sheet for 30 minutes in a boiling aqueous dye bath containing 5% of black acid dye and 5% of oxalic acid, the percentages based on the weight of material to be dyed. The dye is a chromed monoazo black dye identified as C.I. 15711 (Colour Index Number). Next, the material is scoured for 15 minutes in a boiling aqueous scouring bath containing 0.3% of a nonionic detergent by weight of water; then it is dried. The product can be embossed, if desired, in a fine leather-like grain.

The resulting product, an enlarged vertical cross-section of which is shown in FIGURE 4, is a leather-like sheet material which is useful for such applications as shoe uppers, upholstery, handbags, jackets and other garments, hat linings and wherever smooth-surface natural leathers are used. The durability, appearance and comfort characteristics of this product are similar to those of the better grades of natural leather. It has a permeability value of 3500. The surface of the product containing the microporous coating is very smooth, both when relaxed and when stretched. When a shoe is assembled by a conventional method with this product as the shoe upper, all areas of the shoe including the toe area are entirely smooth, with no lumpiness or weave pattern apparent in the surface. When the product is bent sharply upon itself with the coated side inside the fold, the fold pattern inside the fold is characterized by many fine, closely spaced wrinkles. Thus, the product has excellent leather-like grain break.

*Example 4*

Example 3 is repeated except for the omission of the woven fabric. The nonwoven fabric is immersed in dimethyl formamide and coated directly with the layer of polymer solution which becomes the honeycomb-like layer. Except for being slightly thinner and a little more elastic, the product has similar properties and utility to the product of Example 3. It is not essential that the nonwoven fabric be made with great care so that it is entirely free of structural irregularities and minor surface roughness. Nor is it necessary to apply an abnormally thick microporous coat to hide such irregularities and roughness.

For purposes of comparison, Example 4 is repeated except for the omission of the honeycomb-like cellular polymeric layer. The layer of water-modified polymer solution which becomes the microporous coating is applied directly to the nonwoven fabric. The utility of the product for shoe-uppers and upholstery is distinctly inferior to the product of Example 4 because it has a lumpy appearance when in a stretched condition and its grain break is less leather-like.

Also for purposes of comparison, Example 3 is repeated except for the omission of the nonwoven fabric and the honeycomb-like layer. The layer of water-modified polymer solution which becomes the microporous coating is applied directly to the woven fabric. The utility of the product for many applications is definitely inferior to the product of Example 3 because the weave pattern of the fabric is quite noticeable in the coated surface, especially under certain lighting conditions.

*Example 5*

A product having properties and utility similar to the product of Example 1 is produced by repeating Example 1 except for the omission of the nonwoven fabric. Thus, the product consists of the as-formed honeycomb-like polymeric layer in superposed adherence with the woven fabric. The fabric contains polymeric material in the form of a porous vapor permeable structure, since part of the layer of coating solution soaks into the fabric prior to the coagulation step. There is a thin microporous vapor permeable polymeric skin on the exposed surface of the product. An enlarged vertical cross-section of the product is shown in FIGURE 6.

*Example 6*

A pigment blend is prepared by grinding 15 parts of carbon black in a ball mill with a solution of 22.5 parts of an 87:13 copolymer of vinyl chloride and vinyl acetate in 62.5 parts of methyl ethyl ketone. The pigment blend, a polyvinyl chloride solution in dimethyl formamide, and a polyurethane elastomer solution in dimethyl formamide are mixed together in proper proportions to provide a polymer solution coating composition having a solids content of 18% dispersed in a 92.6:7.4 blend of dimethyl formamide and methyl ethyl ketone. The polyurethane elastomer is the same as used in the coating solution of Example 1 except the chain-extender employed in making it consists entirely of hydrazine. The solids content of the coating composition is composed of 60% polyurethane, 20% polyvinyl chloride, 12% vinyl chloride/acetate copolymer and 8% carbon black.

A running length of woven fabric is unwound from a storage roll and dip-coated in a tank of the pigmented polymer-coating composition just described. The woven fabric is a cotton sateen which has been dyed black and buffed into a nap on one surface; it has a width of 53 inches and a weight of one pound per 1.32 linear yards. Nap-side-down, the fabric is passed into the tank of coating composition, through the nip of a pair of squeeze rolls mounted therein, and out of the tank towards a knife-over-cylinder doctor device so that the coated fabric forms an angle of about 45° with the horizontal plane during its travel from the tank to the doctor. The sheet material as it leaves the doctor consists of the fabric which is now impregnated with the coating composition and now bears a coating of substantially equal thickness of the liquid composition on both surfaces. The coated fabric passes from the spreader downward into a tank of water at 24° C., where it remains until the coating on both surfaces is coagulated into a honeycomb-like cellular structure and until the coated fabric is bathed with enough fresh water to remove substantially all of the organic salt therefrom.

The water-wet solvent-free coated fabric is then passed through a sanding machine in which a roll covered with No. 320 abrasive paper lightly abrades each surface without removing any substantial thickness of coating. This abrading step enhances product smoothness and vapor permeability. Next, the coated fabric is passed through a 100° C. oven to dry it. A portion of the "as-dried" product at this stage is wound up on a storage roll and is set aside for use as a vapor permeable leather-like garment material or as a substrate for further coating on one or both sides with a microporous coating in accordance with the teaching of Example 3. The cells in both honeycomb-like layers are similar to those of the product of Example 1.

The balance of the product is passed from the oven through a cooling zone to cool it, and through a sanding machine in which a roll covered with No. 240 abrasive paper abrades each surface until a 10 mil thickness of coating is removed. Finally, the coated fabric, now an attractive man-made suede, is wound up on a storage roll. The black velvety honeycomb-like coating on each side of the fabric is now 12 mils thick and has appearance retention properties as described for the product of Example 2. The product has a permeability value of 11,500 and a flex life of at least 10 million cycles (i.e., there is no noticeable damage when flexed this many cycles on a Schildtknecht type of flex life tester). Utility is the same as shown for the product of Example 2.

*Example 7*

The black velvety man-made suede product of Example 6 is coated on one side with a 7 mil thick microporous coating in accordance with the teaching of Example 3. The resulting smooth-surface leather-like sheet material has a permeability value of 4400, and its properties and utility are similar to the product of Example 3. An enlarged vertical cross-section of the product is shown in FIGURE 5. It will be noted that the product is a fully man-made composite sheet of novel and advantageous structure in which one surface resembles natural suede and the other surface resembles smooth-surface finished natural leather. Either surface can be used in contact with the human body and either surface can be exposed to the weather. Also, as previously explained, each surface has important advantages over corresponding prior art man-made materials.

*Example 8*

Example 6 is repeated except for the following differences.

(1) The woven fabric substrate is a cotton sheeting which has been dyed black and which has a weight of 4.5 ounces per square yard. It has not been napped on either surface.

(2) The coated fabric passes from the doctor downward into a tank of warm water at 54° C., where it remains until the coating on both surfaces is coagulated into a honeycomb-like cellular structure (a period of about 8–10 minutes). Then it passes into a tank of cold water at 16° C., where it remains until the coated fabric is substantially free of organic solvent (a period of several hours).

(3) The portion of the product that is made into a man-made suede has a 4 mil thickness of coating removed from each surface when abraded with No. 240 abrasive paper.

The product at the "as-dried" stage has a honeycomb-like layer on both surfaces about 14 mils thick, a permeability value of 9000, and a flex life of at least 10 million cycles. Utility is the same as shown for the as-dried product of Example 6.

The product at the man-made suede stage has properties and utility similar to the corresponding product of Example 6.

*Example 9*

A solution coating composition consisting of 8.4 parts of polyvinyl chloride, 2.9 parts of di(2-ethylhexyl) phthalate (sometimes referred to as dioctyl phthalate), 86.1 parts of dimethyl formamide and 2.6 parts of water is applied to a glass plate by means of a doctor knife to a wet film thickness of 40 mils. The layer of coating composition is coagulated into a honeycomb-like cellular structure by immersion in water at 24° C. for 10 minutes.

Substantially all of the dimethyl formamide is then removed by further immersion in cold water for several hours. Next, the cellular sheet is removed from the glass plate and dried at 27° C.

The resulting honeycomb-like cellular sheet is useful as a filter for removing microbes and dirt from the air.

When the celular layer of Example 9 is applied in superposed adherence to a fabric, it is useful as a garment and upholstery material.

*Example 10*

A solution coating composition consisting of 10 parts of high molecular weight polyvinyl chloride and 90 parts of dimethyl formamide is doctor-knifed onto the woven fabric of Example 7 to a wet film thickness of 50 mils. The fabric-supported layer of coating composition is immersed in water at 24° C. until it is coagulated into a honeycomb-like cellular structure and until substantially all of the dimethyl formamide is removed. Then the coated fabric is dried at 40° C.

The resulting coated fabric is useful as a filter and as a shoe insole material. It has a permeability value of over 15,000.

*Example 11*

A solution coating composition consisting of 7.5 parts of the polyurethane elastomer defined in the first paragraph of Example 6 and 92.5 parts of dimethyl formamide is doctor-knifed onto the nonwoven fabric of Example 1. The coating composition has a viscosity of one poise at 24° C.

The fabric supported layer of coating composition is immersed in water at 25° C. until it is coagulated into a honeycomb-like cellular structure and until substantially all the dimethyl formamide is removed. Then the coated fabric is dried at 110° C. The dried honeycomb-like layer has a thickness of 22 mils.

The resulting vapor permeable coated fabric can be used as a liner for jackets and shoes; it can also be made into a man-made suede by buffing the cellular coating, or made into a smooth-finish man-made leather by applying a very fine pore microporous polymeric topcoat in accordance with the procedure in Example 3.

The invention is hereby claimed as follows:

1. A sheet material having a permeability value of at least 1000 and comprising a cellular layer of polymeric material in adherence with a surface of a porous fibrous sheet materials at least 50% of the volume of said layer being composed of contiguous elongated cells having
    (a) an average cross-section diameter of about 20–200 microns,
    (b) a substantially perpendicular orientation of their longest dimension in relation to the plane of the surface of the sheet, and
    (c) thin microporous cell walls which, by virtue of their microporosity, render the cells intercommunicating;
wherein at least 51% by weight of said polymeric material consists of a polyurethane elastomer and up to 49% by weight of said polymer consists of a vinyl chloride polymer and wherein the polyurethane elastomer comprises a chain-extended polyurethane polymer formed by the reaction of an excess of an organic diisocyanate and an active hydrogen containing polymeric material selected from the group consisting of polyalkyleneether glycols and hydroxyl-terminated polyesters which produce an isocyanate-terminated polyurethane prepolymer, said prepolymer being chain-extended with a compound having two active hydrogen atoms each bonded to an amino-nitrogen atom.

2. The article of claim 1 in the form of a suede wherein the surface of the cellular layer has open cells formed by the removal of portions of the cell walls adjacent to the surface of the sheet material, the majority of the open cells having a cross-section diameter at the surface of 20–200 microns.

3. The article of claim 1 wherein the open cells of the suede are in superposed adherence with a microporous vapor-permeable topcoating of a polymeric material consisting essentially of a polyurethane elastomer and a vinyl chloride polymer.

4. A man-made sued comprising a cellular layer of a vapor-permeable, flexible, polymeric material, said polymeric material being defined in claim 1, said cellular layer in adherence with the surface of a porous fibrous sheet material at least 50% of the volume of said cellular layer composed of contiguous elongated cells having
    (a) an average cross-sectional diameter of about 20–200 microns,
    (b) a substantially perpendicular orientation of their longest dimension in relation to the plane of the surface of the sheet,
    (c) thin microporous cell walls which, by virtue of their microporosity, render the cells intercommunicating,
    (d) a tapered shape such that their diameters become progressively smaller from the surface of the layer in contact with the substrate to the exposed surface of the layer, and
    (e) the surface of said cellular layer has open cells formed by the removal of the cell walls adjacent to the surface of the sheet material, the majority of the open cells having a cross-sectional diameter at the surface of 20–200 microns.

5. A man-made leather-like sheet material having good smoothness and grain-break characteristics comprising the article of claim 4 wherein said cellular layer is coated with a microporous vapor permeable topcoating of a flexible polymeric material in which the pores are intercommunicating and wherein the polymeric material of the microporous topcoating consists essentially of a blend of a polyurethane elastomer and a vinyl chloride polymer.

6. A method which comprises
    (a) applying to a porous fibrous sheet material substrate a layer of a solution of a polymeric material in a solvent for the polymeric material,
    (b) coagulating said layer into a cellular layer by bathing in a liquid which is a non-solvent for the polymeric material and is at least partially miscible with said solvent; at least 50% of the volume of said cellular layer being composed of contiguous elongated cells having
        (1) an average cross-section diameter of about 20–200 microns,
        (2) a substantially perpendicular orientation of their longest dimension in relation to the plane of the surface of the sheet, and
        (3) thin microporous cell walls which, by virtue of their microporosity, render the cells intercommunicating,
    (c) removing substantially all of the solvent from the cellular layer, and
    (d) removing substantially all of the non-solvent from the resulting substantially solvent-free cellular layer, said polymeric material having an initial modulus below 1.0 gram per denier and consisting essentially of a blend of a polyurethane elastomer and a vinyl chloride polymer, the layer of solution applied to said substrate having sufficient thickness so that the resulting cellular layer is over 10 mils thick when fully dry.

7. The method of claim 6 wherein step (c) is performed by further bathing the cellular layer with a liquid which is a non-solvent for the polymeric material.

8. The method of claim 6 wherein said layer of solution is applied to both surfaces of the substrate, and both layers are coagulated simultaneously to produce a sheet material having a permeability value of at least 1000.

9. The method of claim 6 wherein the exposed surface of the resulting cellular layer is abraded sufficiently to leave the majority of the cells in the exposed surface with a cross-sectional diameter at the surface of 20–200 microns.

10. A method of making a man-made suede comprising
(a) applying to at least one surface of a porous fibrous flexible sheet material a layer of a solution in dimethyl formamide of a polymeric blend consisting essentially of a polyurethane elastomer and a vinyl chloride polymer, said polymeric blend having an initial modulus of less than 1.0 gram per denier, said solution having a polymer solids content of about 10–30 percent by weight and a viscosity of about 10–500 poises at 24° C., and said layer having sufficient thickness that the resulting cellular layer is over 10 mils thick when fully dry;
(b) coagulating said layer into a cellular layer as defined in claim 6 by bathing with water;
(c) removing substantially all of the dimethyl formamide from the layer by further bathing with water; and
(e) abrading the exposed surface of the cellular layer sufficiently to leave the majority of those cells in the exposed surface with a cross-sectional diameter at the surface of 20–200 microns.

References Cited by the Examiner

UNITED STATES PATENTS

| | | |
|---|---|---|
| 2,157,243 | 5/1939 | Minor. |
| 2,533,976 | 12/1950 | Teague. |
| 2,536,183 | 1/1951 | Jamieson _____ 156—153 |
| 2,629,678 | 2/1953 | Thompson et al. |
| 2,694,029 | 11/1954 | Skinner _____ 156—154 |
| 2,940,871 | 6/1960 | Smith-Johannsen _____ 117—63 |
| 3,000,757 | 9/1961 | Johnston et al. |
| 3,050,432 | 8/1962 | Weinbrenner et al. ___ 156—196 |
| 3,067,482 | 12/1962 | Hollowell _____ 28—74 |
| 3,100,721 | 8/1963 | Holden _____ 117—135.5 |
| 3,190,766 | 6/1965 | Yuan _____ 117—135.5 |
| 3,208,875 | 9/1965 | Holden _____ 117—135.5 |

ALEXANDER WYMAN, *Primary Examiner.*

EARL M. BERGERT, L. T. PIRKEY, MORRIS SUSSMAN, *Assistant Examiners.*